March 2, 1948.    N. B. MEARS    2,437,229
PHOTO-PRINTING APPARATUS
Filed Nov. 5, 1945    2 Sheets-Sheet 1
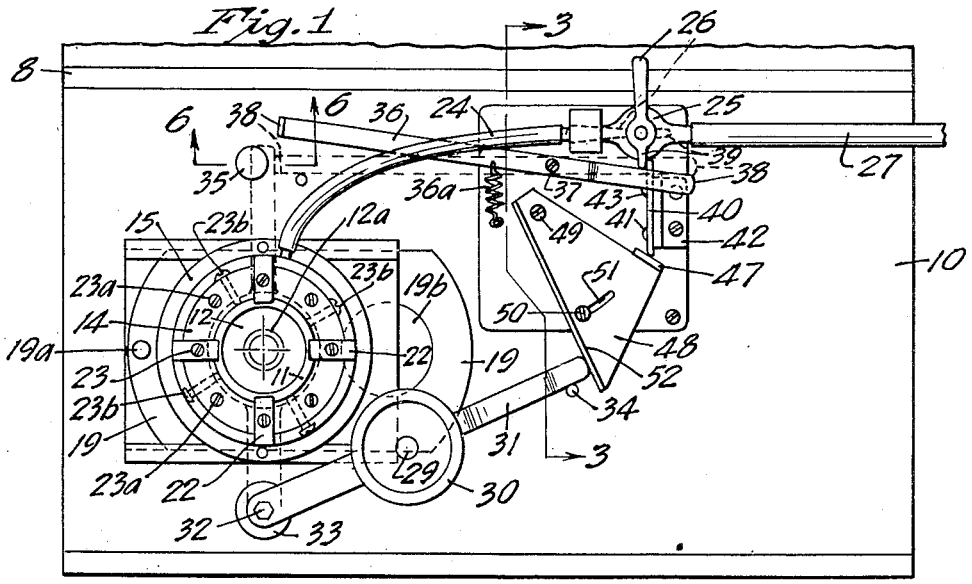
Inventor
Norman B. Mears
By John E. Thyken Jr.
Attorney March 2, 1948. N. B. MEARS 2,437,229
PHOTO-PRINTING APPARATUS
Filed Nov. 5, 1945 2 Sheets-Sheet 2
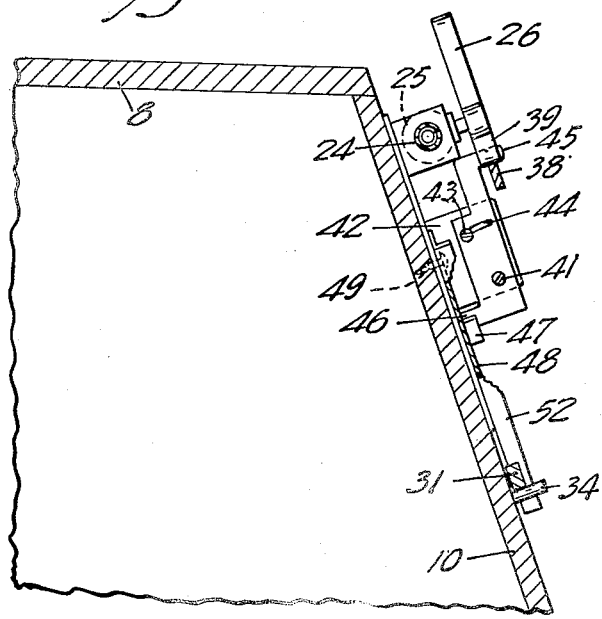
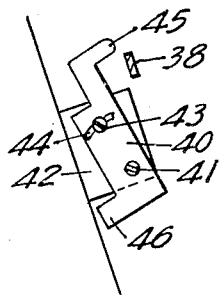
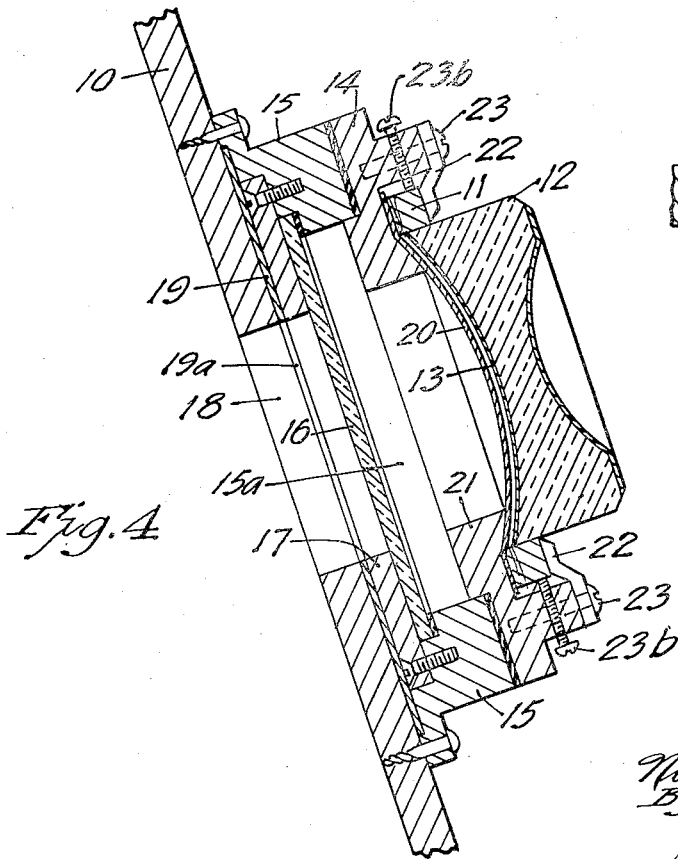
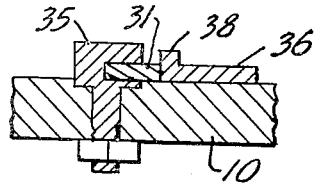
Inventor
Norman B. Mears
By John E. ...
Attorney Patented Mar. 2, 1948

2,437,229

UNITED STATES PATENT OFFICE 2,437,229

PHOTOPRINTING APPARATUS

Norman B. Mears, West St. Paul, Minn., assignor to Buckbee-Mears Company, St. Paul, Minn., a corporation of Minnesota Application November 5, 1945, Serial No. 626,737

4 Claims. (Cl. 95—76)

This invention relates particularly, although not exclusively, to photo-printing on convex, concave or other non-planar surfaces and to apparatus for insuring accuracy and uniformity in the reproductions from translucent films or negatives on non-planar surfaces of preformed substantially rigid backing materials.

Heretofore photo-printing with a high degree of accuracy and uniformity on non-planar, rigid surfaces has involved unnecessary hand work and the products have been relatively expensive because of the difficulties attendant upon holding the negatives in proper position relative to the blanks and of applying the pressure required to avoid halation during the photo-printing exposure. Since the blanks are rigid and non-planar in shape, ordinary vacuum printing frames cannot be used for this operation. According to the present invention the negative or positive film or plate, herein called the negative, and work blank are held in accurate registry and in firm contact one with the other in a holder and during exposure fluid pressure is applied directly to the exposed face of the negative while air is forced out or it withdrawn from between the negative and work surface. The negative is sufficiently flexible and is so shaped as to conform exactly to the non-planar, light-sensitive surface of the blank under the applied pressure.

It is an object of my invention to provide novel apparatus of this class adapted to facilitate the reproduction of various fine line designs, scales and/or other markings in quantity on manufactured articles including precision parts of optical instruments, such as lenses and reticles, printing plates and many other products.

A particular object is to insure accurate and uniform location of sharply defined designs or markings on the several work blanks by providing apparatus for holding the several blanks in position for exposure to a source of light and in predetermined position relative to a flexible transparency or negative constituting a wall of an air chamber, the negative being formed to fit the light-sensitive surface of the blank, and including means for applying air pressure to the exposed surface of the negative during the photo-printing exposure to light.

A further object is to provide apparatus of this class with means for guarding against the accidental displacement of or damage to the negative by the application of air pressure to one face thereof in the absence of a support for the opposite face thereof in the blank holder.

Other objects will appear and be more fully pointed out in the following specification and claims.

The invention will be best understood by reference to the accompanying drawings, which illustrate, by way of example and not for the purpose of limitation, a preferred form of my improved apparatus. In the drawing:

Figure 1 is a front elevational view of the apparatus, with a portion of the light box broken away;

Fig. 2 is a part end elevational view and part vertical sectional view of the apparatus;

Fig. 3 is a fragmentary cross sectional view taken approximately on the line 3—3 of Fig. 1, portions of the latch mechanism being broken away to show parts otherwise concealed;

Fig. 4 is a fragmentary central angular section on a larger scale showing the pressure chamber and blank holder, with a lens blank partially withdrawn from the holder;

Fig. 5 is a detail view showing one of the latch members in elevation, and

Fig. 6 is a fragmentary section through the latch mechanism taken on the line 6—6 of Fig. 1.

Referring to the drawings, the numeral 8 indicates generally the light box of my apparatus containing a light source 9 of suitable candlepower and having a sloping front panel 10 upon which my improved apparatus is mounted. This apparatus is shown as having a holder ring 11 adapted to receive a lens blank 12 on which a fine line design 12a (Fig. 1) or other marking is to be reproduced. A concave surface of the lens 12 has a coating 13 of light-sensitive enamel to receive the marking or design. Where the design is to be etched into a glass lens or reticle, the concave or other non-planar face of the glass is first silvered in known manner, as by using the Rochelle salt method of precipitating silver, or any other suitable silvering process. The silvered surface is then cleansed and buffed and is photo-sensitized with a bichromated shellac of suitable type, such as commercial cold top enamel, to form the coating 13.

To hold such blanks I mount the ring 11 on an outer ring 14 and fasten the latter to the front face of a cylindrical chamber wall 15. This wall is fastened to the panel 10 and has an inner end closure comprising a transparent plate 16 held in place by a ring 17 in registry with an opening 18 formed in the panel 10 for the passage of light from the source 9 to a chamber 15a and sensitized blank beyond. Interposed between the light source and chamber 15a is a slidable shutter 19 having a handle 19a which is accessible from the front face of the panel 10. An opening 19b is formed in the shutter 19 to register with the opening 18 when the shutter is in open position.

A film 20 of flexible, transparent material forms the front end closure of the air chamber and carries on its emulsion coated outer face a design 12a or other marking to be reproduced on the blanks 12. The periphery of the film 20 is clamped and sealed between the ring 11 and a flange 21 formed on the ring 14. The clamping pressure is applied to the ring 11 by a series of lugs 22 held in place by screws 23 threaded in the ring 14. Longer screws 23a (Fig. 1) hold the ring 14 in sealed relation to the wall 15 and radially extending screws 23b are threaded in the ring 14 to engage the ring 11 for centering it accurately relative to the negative film 20, the periphery of the ring 11 being spaced from the adjacent cylindrical surface of the ring 14 to permit the required range of adjustment, as indicated in Fig. 4. The film 20 is shaped to conform to the sensitized surface of the blank 12.

Air under pressure is supplied to the chamber 15 through a tube 24 under control of a valve 25 mounted on the panel 10 and having a manually operable handle 26 adapted to be moved from a closed position indicated in full lines in Figs. 1–3 to an open position indicated in broken lines in Fig. 1. The valve 24 is of the type having an exhaust port which is opened to atmosphere to allow the escape of air from the tube 24 and chamber 15a when the valve is moved to closed position for cutting off the supply of air from the tube 27. This apparatus has been operated successfully with air pressures equal to approximately 25 pounds per square inch.

Mechanism is provided for clamping the blanks 12 successively in the holder ring. This mechanism includes a disk 28 having a rubber facing for contact with the blanks. The disk is mounted on an axially disposed spindle 29 having a handle 30 and threaded in an arm 31. At one end, the arm 31 is pivoted on a screw 32 threaded in a supporting bracket 33 and its opposite end portion is adapted to oscillate between a position where it is in contact with a stop pin 34 to another position where it is in contact with a stop 35. As best shown in Fig. 6, the stop 35 is formed with a notch to receive the arm 31 and hold it from springing away from the panel 10 when in clamping position with respect to the blank 12 in the holder ring 11.

Latch mechanism is provided to guard against the accidental displacement or rupture of the film 20 by the application of pressure in the chamber 15a in the absence of a supporting work blank 12 in the holder ring 11. This mechanism locks the valve 25 in closed postion when the clamp arm 31 is in the retracted position shown in full lines in Fig. 1 and locks the arm 31 in work-securing position (Fig. 2) when the valve is in open position. The latch mechanism has a rigid arm 36 pivotally connected to the panel 10 by a screw 37 and formed with a lug 38 normally held in the path of the arm 31 by a spring 36a to lock the arm 31 in clamping position. The opposite end portion 38 of the arm 36 is arranged to be actuated downward by a finger 39 projecting from the valve handle 26 to free the arm 31. Another latch member comprises a plate 40 (Fig. 5) connected by a pivot screw 41 to a supporting bracket 42 mounted on the panel 10. The plate 40 is adapted to oscillate in a plane perpendicular to the panel 10 and its movement is limited by means of a screw 43 fitting loosely in an arcuate guide slot 44 in the plate. A lug 45 projects from the upper end of the plate 40 to be moved to and from the path of the finger 39, this plate being arranged so that it is moved by gravity to retract the lug 45 from the path of the finger 39. Projecting laterally from the lower end portion of the member 40 is a lug 46 adapted to be engaged by a flange 47 formed on a latch member 48. A pivot screw 49 (Fig. 1) connects the member 48 to the panel 10 and a second screw 50 engages this member in a guide slot 51 to limit its oscillating movement about the screw 49. A flange 52 is formed on the member 48 to project in the path of the free end of the arm 31. As this arm is swung downward toward the stop pin 34 it strikes the flange 52 and actuates the member 48 so that the flange 47 raises the lug 46 and oscillates the member 40 to project the lug 45 into the path of the finger 39 on the valve handle 26. This locks the valve handle in closed position wherein the flow of air from tube 27 to the pressure chamber 15a is cut off and this chamber is vented to atmosphere.

In operation, assuming that the several parts are in the positions indicated in full lines in Fig. 1, the operator places one of the blanks 12 in the holder ring 11 with the light-sensitive coat 13 adjacent to the film 20. The arm 31 carrying the clamping disk 28 is then moved to the clamping position shown in broken lines in Fig. 1 and in full lines in Fig. 2 and the handle 30 is turned sufficiently to press the blank 12 against its seat at the periphery of the film 20 supported by the ring 21, while the arm 31 engages the stop pin 35 in the notch therein, as further indicated in broken lines in Fig. 1 and in full lines in Fig. 6. Upon movement of the arm 31 out of engagement with the flange 52 of the latch member 48, the latter drops to free the lug 46 on the plate 40 and allows plate 40 to move by gravity to withdraw the lug 45 from the path of the finger 39 carried by the valve handle 26. This unlocks the valve and the operator then moves the valve to its open position indicated in dotted lines in Fig. 1, thereby admitting air under pressure to the chamber 15a through the tube 27, valve 25 and tube 24. Such operation of the valve allows the arm 36 to oscillate to locked position relative to the arm 31.

Pressure in the chamber 15a forces the film 20 into firm contact with the coated face of the blank 12 while all air escapes from between the film and blank at the periphery of the latter. Thereupon the operator actuates the shutter 19 to bring the aperture 19b therein to registry with the opening 18 and thereby expose the film and work blank to light emanating from the source 9. Exposure is continued for the time required and then the shutter 19 is closed. To remove the blank 12 from the holder ring 11, it is necessary first to move the valve handle 26 to closed position and thereby relieve the pressure in the chamber 15a by exhausting air therefrom through the valve. Movement of the valve to closed position actuates the right end portion of the arm 36 downward, as indicated in Fig. 1, and moves the lug 38 out of the path of the arm 31. Thereupon the clamping pressure on the blank 12 is relieved by a partial turn of the handle 30 and the arm 31 is oscillated to the right and downward to the full line position shown in Fig. 1. This permits the removal of the blank 12 from the ring 11. With the arm 31 and clamp disk 28 in the retracted position shown in full lines in Fig. 1, the latch members 48 and 40 are held in the locking position with reference to the valve handle finger 39, as hereinbefore described.

After removing the blank 12 from the holder the exposed face is developed in conventional manner to remove the remaining soluble portions of the coating 13 and leave the portions which have been rendered insoluble by exposure to the light. Where the blank has a silver coating underlying the light sensitive coating the exposed areas of the silver may be removed by the use of a suitable reagent, such as Farmer's reducer, leaving the glass exposed over the areas which are to be etched. Suitable staging and masking operations are then performed, followed by etching of the design into the glass surface by exposure to the fumes of hydrofluoric acid or other etching agent. Subsequently the enamel, silver and other masking materials are removed and the etched lines are filled with a suitable pigment, such as one of the oxides, in a binder of sodium silicate, for example.

A high degree of accuracy both in the reproduction of the negative design and in the location of the reproduction on the blank is obtained by my arrangement for securely holding the negative in fixed relation to the blank in the holder and for insuring perfect contact between the negative and coated face of the blank during exposure. The negative is a thin, flexible sheet of transparent plastic material having sufficient elasticity to conform to the concave, convex or other non-planar shape of the sensitized blank surface. An acetate film having an emulsion coating of standard or suitable composition may be used and the image of the design to be reproduced may be photoprinted and developed on such plane, flat film material by conventional procedure. Subsequently the film is shaped in dies to fit the sensitized surface of the work blanks. Where ordinary thermo-plastic film material is used it usually requires heating to render it sufficiently plastic in the forming dies. Upon cooling, the film 20 sets in the required shape. It is finally centered in the holder of my apparatus and clamped in place with the emulsion side disposed for contact with the blanks.

Having described my invention, what I claim as new and desire to protect by Letters Patent is:

1. Apparatus for photo-printing on a light-sensitized, non-planar surface of a blank comprising, a source of light, a holder for the blank, a manually operable backing member for securing the blank in said holder, said member being movable to an inoperative position to permit the removal of the blank, a chamber having a transparent wall allowing the passage of light from said source to the coated surface of the blank in said holder, said wall being shaped to conform to said surface and carrying the image to be reproduced on the blank, means including a valve for supplying gas under pressure above atmospheric to said chamber to forcibly press said wall against the non-planar surface of the blank and latch mechanism interposed between said valve and backing member adapted to retain said valve in closed position when the backing member is in inoperative position.

2. Apparatus for photo-printing on a non-planar surface having a light-sensitive coating comprising, a source of light, a holder for the work, a manually operable backing member for securing the work in said holder, said member being movable to an inoperative position to permit the removal of the work from the holder, a chamber having a transparent wall allowing the passage of light from said source to the coated surface of the work in said holder, said wall being flexible and shaped to conform to the coated surface of the work and carrying the image to be reproduced on the work, means including a valve for supplying gas under pressure above atmospheric to said chamber to cause said wall to make contact with the non-planar, coated surface of the work during the photo-printing operation and latch mechanism interposed between said valve and backing member adapted to retain said valve in closed position when the backing member is in inoperative position and to retain the backing member in work-securing position when the valve is in open position.

3. Apparatus for photo-printing on a light-sensitized, non-planar surface of a blank comprising, a holder for the blank, a negative secured at its margins to the holder and forming a translucent wall thereof, means for exposing the negative and blank to actinic light, clamping means for securing the blank in said holder in contact with and in predetermined fixed relation to the negative therein, a valve, means under control of said valve for subjecting the outer surface of the negative to fluid pressure above atmospheric and latch mechanism adapted to lock said valve in closed position when said clamping means is in inoperative position and to lock said clamping means in blank-securing position when said valve is in open position.

4. For photo-printing on similar precision blanks each having edge surfaces, a back face and an oppositely disposed, non-planar, sensitized front face, the improved apparatus which comprises a source of light, a housing containing said source of light, said housing having a translucent wall portion, an air chamber mounted on said housing exteriorly of the translucent wall portion thereof and having a flexible translucent wall disposed opposite to said wall portion and carrying an image to be reproduced on the several blanks, a holder for the successive blanks formed to fit and embrace the edge surfaces of the same and having an opening opposite said flexible transparent wall, a manually operable backing member adapted to engage the back surfaces of the several blanks and to press the front surfaces thereof in contact with said flexible translucent wall, said backing member being movable to an inoperative position to permit the insertion and removal of the blanks through said opening in the holder, said flexible translucent wall being shaped to conform to the non-planar, sensitized surfaces of the several blanks, and means for supplying gas under pressure above atmospheric to said chamber during the photo-printing operation to forcibly press said flexible translucent wall in contact with the non-planar, sensitized surface of a blank in said holder and when the blank is confined therein by said backing member.

NORMAN B. MEARS.

REFERENCES CITED

The following references are of record in the file of this patent:

UNITED STATES PATENTS

| Number | Name | Date |
|---|---|---|
| 844,162 | Mertens | Feb. 12, 1907 |
| 1,865,262 | Koppe | June 28, 1932 |
| 1,885,532 | Mazzocco | Nov. 1, 1932 |
| 2,073,313 | Murray | Mar. 9, 1937 |